US011237887B2

United States Patent
Chew et al.

(10) Patent No.: US 11,237,887 B2
(45) Date of Patent: Feb. 1, 2022

(54) DEVICE, SYSTEM AND METHOD FOR GENERATING AND RENDERING CUSTOMIZED APPLICATION DATA FOR FIRST RESPONDERS

(71) Applicant: MOTOROLA SOLUTIONS, INC., Chicago, IL (US)

(72) Inventors: Yen Hsiang Chew, Bayan Lepas (MY); Mohammad Athari Ismail, Simpang Ampat (MY); Sin Siong Heng, Segamat (MY); Lee Sun Ooi, Kulim (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/665,419

(22) Filed: Oct. 28, 2019

(65) Prior Publication Data

US 2021/0124630 A1    Apr. 29, 2021

(51) Int. Cl.
*G06F 9/54*     (2006.01)
*G06F 16/958*   (2019.01)
(Continued)

(52) U.S. Cl.
CPC .............. *G06F 9/546* (2013.01); *G06F 9/542* (2013.01); *G06F 9/547* (2013.01); *G06F 16/958* (2019.01);
(Continued)

(58) Field of Classification Search
CPC ...... G06Q 50/26; G06Q 50/265; G06F 9/546; G06F 16/958; G06F 16/0558; G06F 16/9556; G06F 9/542; G06F 9/547; G06F 16/44; G06F 16/954; H04W 4/90; H04W 76/50; H04W 4/029; H04W 4/08; H04M 1/72418; H04M 2203/5009;
(Continued)

(56) References Cited

U.S. PATENT DOCUMENTS 6,098,106 A * 8/2000 Philyaw ................. G06Q 30/02
                                                709/238
9,448,790 B2   9/2016 Collison et al.
(Continued)

FOREIGN PATENT DOCUMENTS

DE        10200400359 A1    8/2005

*Primary Examiner* — Tonia L Dollinger
*Assistant Examiner* — Linh T. Nguyen
(74) *Attorney, Agent, or Firm* — Perry + Currier, Inc.

(57) ABSTRACT

A device, system and method for generating and rendering customized application data for first responders is provided. A device receives an assignment identifier and input to access a web-based application using a link and a browser application. The device incorporates the assignment identifier into the link to generate a customized link and launches the browser application using the customized link to retrieve customized application data indicative of the web-based application customized according to the assignment identifier. The device controls a display screen to render the customized application data in the browser application. A server receives the customized link from the device, generates the customized application data, indicative of the web-based application customized according to the assignment identifier, and transmits the customized application data to the device.

14 Claims, 8 Drawing Sheets

(51) Int. Cl.
   *G06F 16/955* (2019.01)
   *G06Q 50/26* (2012.01)
(52) U.S. Cl.
   CPC ...... *G06F 16/9558* (2019.01); *G06F 16/9566* (2019.01); *G06Q 50/26* (2013.01)
(58) Field of Classification Search
   CPC .......... H04M 1/72424; H04M 2242/04; G08B 27/001; G08B 25/006; G08B 5/222; H04L 67/306
   See application file for complete search history.

(56) References Cited

U.S. PATENT DOCUMENTS

| | | | |
|---|---|---|---|
| 10,133,812 | B2 | 11/2018 | Lee et al. |
| 2008/0275963 | A1 | 11/2008 | Hatfield |
| 2011/0010470 | A1* | 1/2011 | Hulbert ............... H04L 63/0853 710/13 |
| 2011/0087510 | A1* | 4/2011 | Putra ................ G06Q 10/06311 705/7.13 |
| 2012/0204089 | A1* | 8/2012 | Boudreau .............. G01C 21/26 715/205 |
| 2012/0305644 | A1* | 12/2012 | Daniels, Jr. ............ G16H 40/20 235/380 |
| 2014/0164613 | A1 | 6/2014 | Mason et al. |
| 2015/0186973 | A1* | 7/2015 | Athimoolam ...... G06Q 30/0625 705/26.62 |
| 2016/0211931 | A1* | 7/2016 | Takahashi .............. H04H 20/59 |
| 2016/0328536 | A1* | 11/2016 | Webb .................... G16H 10/60 |
| 2017/0287317 | A1* | 10/2017 | Tavares ................. G08B 25/10 |
| 2019/0174289 | A1* | 6/2019 | Martin .................. H04W 4/029 |
| 2020/0314240 | A1* | 10/2020 | Leavitt .................. G16H 80/00 |

\* cited by examiner

DEVICE, SYSTEM AND METHOD FOR GENERATING AND RENDERING CUSTOMIZED APPLICATION DATA FOR FIRST RESPONDERS

BACKGROUND OF THE INVENTION

First responders, such as police officers, fire fighters, and the like, may generally be in mission critical situations where a length of time to access crucial information may be vital.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
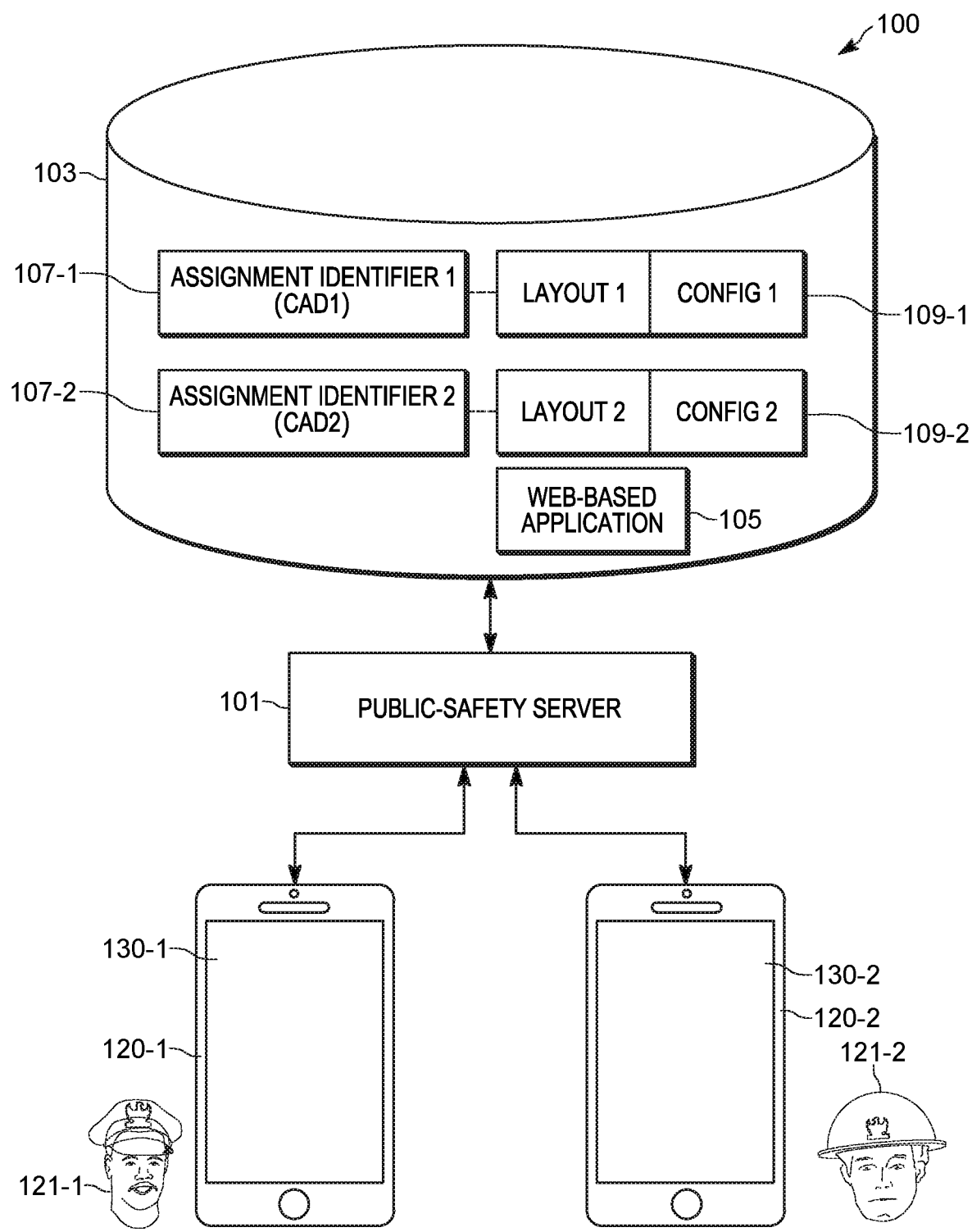
FIG. 1 is a system for rendering customized application data for first responders, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

First responders, such as police officers, fire fighters, and the like, may generally be in mission critical situations where a length of time to access crucial information may be vital when responding to an incident.

Hence, according to the present specification, web-based (and/or cloud-based) mission critical applications accessed by devices may be customized using an assignment identifier which may identify an incident and/or an incident type and/or a role of a first responder assigned to an incident. For example, an assignment identifier may be pushed from a public safety server to a device to assign an associated first responder (e.g. using the device) to an incident. When the device uses a browser application to open a link to a web-based application, the assignment identifier may be incorporated into the link and the customized link may be used in a browser application to retrieve customized application data from the public safety server, the customized application data customized according to the assignment identifier, the customized application data indicative of the web-based application.

An aspect of the specification provides a device comprising: a communication unit; an input device; a display screen; a memory storing: a link to a web-based application; and a browser application; and a controller communicatively coupled to, the communication unit, the input device, the display screen, and the memory, the controller configured to: receive, via the communication unit, an assignment identifier; receive, via the input device, input to access the web-based application using the link and the browser application; incorporate the assignment identifier into the link to generate a customized link; launch the browser application using the customized link to retrieve, via the communication unit, customized application data indicative of the web-based application customized according to the assignment identifier; and control the display screen to render the customized application data in the browser application.

Another aspect of the specification provides a method comprising: receiving, at a device, an assignment identifier; receiving, via an input device, input to access a web-based application using a link and a browser application stored at a memory; incorporating, at the device, the assignment identifier into the link to generate a customized link; launching, at the device, the browser application using the customized link to retrieve customized application data indicative of the web-based application customized according to the assignment identifier; and controlling a display screen to render the customized application data in the browser application.

Another aspect of the specification provides a server comprising: a communication unit; and a controller communicatively coupled to the communication unit, the controller configured to: receive, via the communication unit, from a device, a customized link to a web-based application, the customized link comprising an assignment identifier; generate customized application data indicative of the web-based application customized according to the assignment identifier; and transmit, via the communication unit, to the device, the customized application data.

Another aspect of the specification provides a method comprising: receiving, at a server, from a device, a customized link to a web-based application, the customized link comprising an assignment identifier; generating, at the server, customized application data indicative of the web-based application customized according to the assignment identifier; and transmitting, from the server, to the device, the customized application data.

Attention is directed to FIG. 1, which depicts an example system 100 for generating and rendering customized application data for first responders. Communication links between components of the system 100 are depicted in FIG. 1, and throughout the present specification, as double-ended arrows between respective components; the communication links may include any suitable combination of wireless and/or wired links and/or wireless and/or wired communication networks.

The system 100 comprises a server 101, such as (e.g. as depicted) a public safety server, and the like, that has access to a memory, for example (e.g. as depicted) a database 103 storing a web-based application 105, and one or more assignment identifiers 107-1, 107-2 stored in respective association with one or more sets of customization data 109-1, 109-2 for customizing application data indicative of the web-based application 105, as described in more detail below. In particular, as depicted, the assignment identifier 107-1 comprises "CAD1" and the assignment identifier 107-2 comprises "CAD2".

As depicted, the system 100 further comprises one or more communication devices 120-1, 120-2 associated with, and/or operated by, a respective first responder 121-1, 121-2. As depicted, the first responder 121-1 comprises a police officer and the first responder 121-2 comprises a fire fighter. The communication devices 120-1, 120-2 comprise a respective display screen 130-1, 130-2.

In some examples, one or more of the communication devices 120-1, 120-2 may comprise, and/or be connected to, a peripheral device, such as a remote-speaker-microphone (RSM), a personal area network device (e.g. another device carried by a respective first responder 121-1, 121-2), a vehicle area network device (e.g. a communication device 120-1, 120-2 may be a vehicle communication device in communication with other vehicle devices, such as a car camera, and the like), and the like. In these examples, a peripheral device may be identified via a peripheral device identifier which may identify a type of the peripheral device identifier. A communication device 120-1, 120-2 may be configured to perform a scan of a personal area network and/or a vehicle area network, and the like, to establish communication with peripheral devices (e.g. when forming a personal area network and/or a vehicle area network) and receive one or more peripheral device identifiers from peripheral devices with which a communication device 120-1, 120-2 has established communication. The peripheral device identifiers may be stored in a memory of a communication device 120-1, 120-2.

Hereafter, the assignment identifiers 107-1, 107-2, customization data 109-1, 109-2, communication devices 120-1, 120-2, first responders 121-1, 121-2 and display screens 130-1, 130-2 will interchangeably be referred to, collectively and respectively, as assignment identifiers 107, customization data 109, communication devices 120, first responders 121 and display screens 130, and, generically and respectively, as an assignment identifier 107, customization data 109 (and/or a set of customization data 109), a communication device 120, a first responder 121 and a display screen 130.

As will be described below, an assignment identifier 107 may be assigned to a first responder 121 and/or an associated communication device 120, for example when an incident occurs, by the server 101 and/or another server (e.g. a computer-aided dispatch (CAD) server), and the like. The assignment identifier 107 may, for example, comprise one or more of an incident identifier, a CAD identifier, a role identifier, and the like. In particular, an incident identifier may identify a particular incident to which a first responder 121 is assigned. A CAD identifier may be a particular example of an identifier identifying an incident as assigned by a CAD. A role identifier may identify a role of a first responder 121 assigned to the incident (e.g. police officer, fire fighter, a supervisor, and the like). Furthermore, more than once incident identifier and/or CAD identifier may be assigned to an incident; for example, a first incident identifier and/or first CAD identifier may be assigned for a first type of first responder (e.g. police officers) and a second incident identifier and/or second CAD identifier may be assigned for a second type of first responder (e.g. fire fighters). However, any suitable assignment identifier 107 is within the scope of the present specification.

In the present examples, as the first responder 121-1 is a police officer, the first responder 121-1 may be assigned the assignment identifier 107-1 that is particular to police officers responding to an incident, and/or the assignment identifier 107-1 may be specifically assigned to the first responder 121-1, but not all police officers responding to the incident. Similarly, in the present examples, as the first responder 121-2 is a fire fighter, the first responder 121-2 may be assigned the assignment identifier 107-2 that is particular to fire fighters responding to an incident, and/or the assignment identifier 107-2 may be specifically assigned to the first responder 121-2, but not all fire fighters responding to the incident.

Indeed, while two first responders 121 (and associated communication devices 120) and two respective assignment identifiers 107 are depicted, the system 100 may comprise as few as one first responder 121, one associated assignment identifier 107 and communication device 120, or more than two first responders 121 (and associated communication devices 120) and more than two associated assignment identifiers 107 and communication devices 120. Furthermore, while specific types of first responders 121 are depicted, the first responders 121 may include any suitable type of first responder and/or, more generically, public safety personnel, such as paramedics, and the like.

The web-based application 105 may comprise instructions and/or data and the like for implementing the web-based application 105, which may be used, for example, by the first responders 121 when responding to an incident and the like. In general, a first responder 121 may operate a respective communication device 120 to access the web-based application 105 using a link and a browser application stored at the respective communication device 120. For example, the web-based application 105 is generally associated with a network address, including, but not limited to, an Internet Protocol (IP) address, a Uniform Resource Locator (URL), and the like and the link to the web-based application 105 may comprise the associated IP address, URL, and the like.

In present examples, the web-based application 105 will be described with respect to a mapping application, however the web-based application 105 may comprise any suitable application used by first responders including, but not limited to an incident management application, a data collection application, a communication application, a video application, a report writing application, a surveillance application, a digital evidence collection application, a data and/or evidence storage application, a data and/or evidence retrieval application, an internet of things (IoT) application, a health monitoring application, a digital assistant application, a public safety database application, and the like.

An assignment identifier 107 may be stored, at the database 103, and the like, in association with respective customization data 109. As depicted, the customization data 109 may include, but is not limited to, visual layout data (e.g. "Layout 1", "Layout 2") for customizing a visual layout of the web-based application 105, and configuration data (e.g. "Config 1", "Config 2") for customizing a configuration of the web-based application 105 and the like. Hence as depicted, a visual layout and/or a configuration of the web-based application 105 is stored in association with an assignment identifier 107 as the customization data 109.

In particular, a visual layout and/or configuration of the web-based application 105 may be customized for police officers and/or fire fighters and/or for other types of first responders. For example, when the web-based application 105 comprises a mapping application, the web-based application 105 may be customized for police officers by showing a map of an incident area that shows suggested intersections that should be blocked off, historic crime info in the area, features an/or options particular for police officers and the like. Similarly, when the web-based application 105 comprises a mapping application, the web-based application 105 may be customized for fire fighters by showing a fastest route from a fire station to a location of an incident, locations of fire hydrants, features an/or options particular for fire fighters and the like.

Hence, for example, the visual layout data may indicate a particular view and/or region and/or route, and the like, that may be provided at a mapping application, and the like, and the configuration data may indicate particular features that may be provided at a mapping application, and the like. Hence, in general, the visual layout data may indicate an arrangement of information and/or data to be rendered at a display screen 130 when the web-based application 105 is accessed via a communication device 120, and the configuration data may indicate features to be provided at the display screen 130 in the web-based application 105 when the web-based application 105 is accessed via a communication device 120. In some examples, the visual layout data may indicate an arrangement of features indicated by the configuration data.

However, the customization data 109 may generally indicate any suitable customization of the web-based application 105.

Furthermore, while a particular database structure is depicted in FIG. 1, the components of the database 103 may be stored according to any suitable structure and/or in any suitable manner including, but not limited to, storing the information in one or more databases and/or one or more memories (e.g. that may or may not include databases and/or a database structure). Hence, for example, the database 103 is understood to be stored at one or more memories and/or the database 103 may be replaced by one or more memories.

Figure 2:
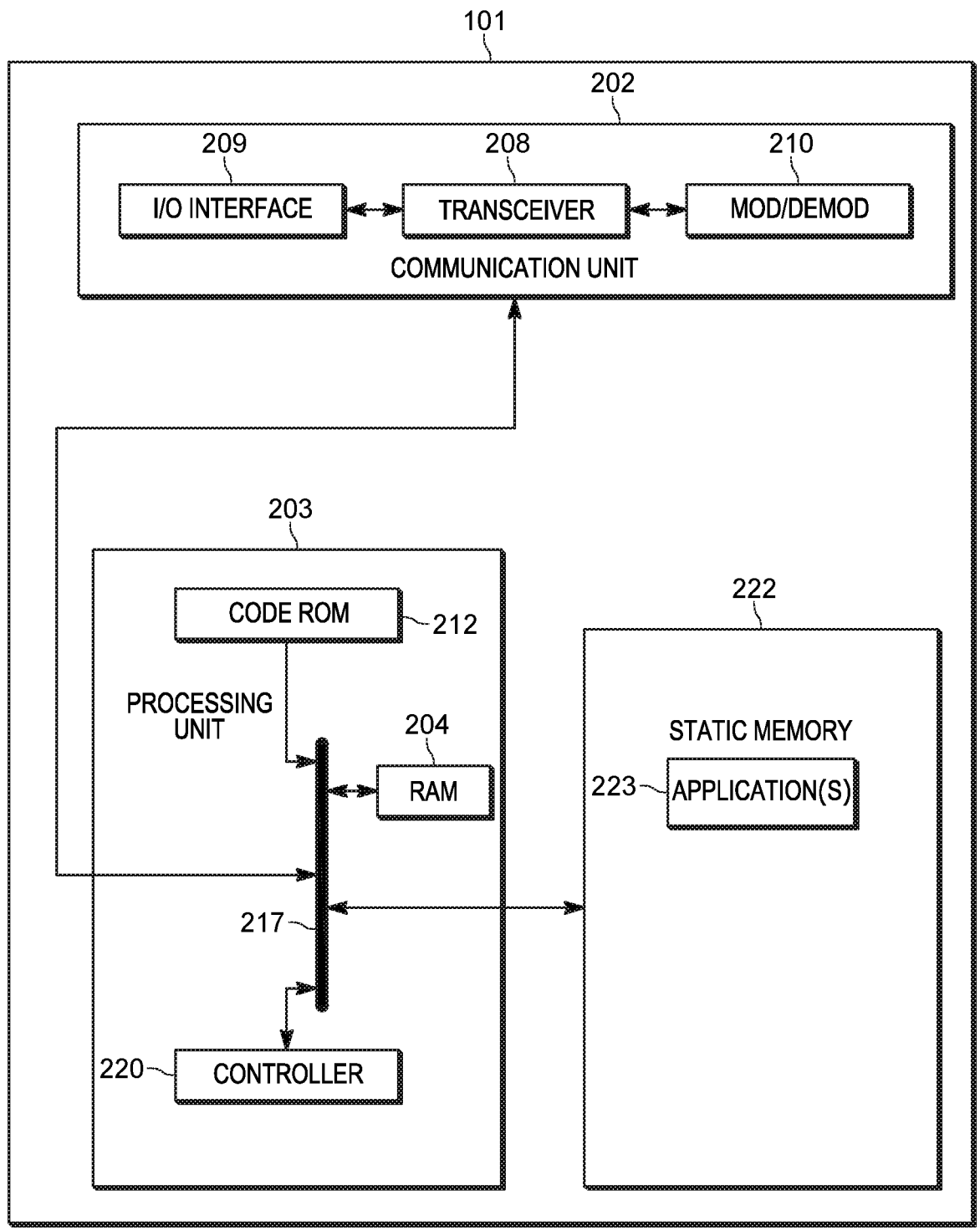
FIG. 2 is a diagram showing a structure of a server for generating customized application data for first responders, in accordance with some examples.

Attention is next directed to FIG. 2 which depicts a schematic block diagram of an example of the server 101. In general, the server 101 may comprise one or more servers and/or one or more cloud computing devices, and the like, configured to communicate with the communication devices 120 and the database 103. However, the server 101 may comprise a computing device such as a personal computer and/or a laptop computer, an embedded computing device and the like.

As depicted, the server 101 comprises: a communication unit 202, a processing unit 203, a Random-Access Memory (RAM) 204, one or more wireless transceivers 208, one or more wired and/or wireless input/output (I/O) interfaces 209, a combined modulator/demodulator 210, a code Read Only Memory (ROM) 212, a common data and address bus 217, a controller 220, and a static memory 222 storing at least one application 223. Hereafter, the at least one application 223 will be interchangeably referred to as the application 223. In some examples, the memory 222 may store the database 103 and/or the web-based application 105 and/or the assignment identifiers 107 and/or the customization data 109.

While not depicted, the server 101 may include one or more of an input device and a display screen, and the like, such that a user may interact with the server 101.

As shown in FIG. 2, the server 101 includes the communication unit 202 communicatively coupled to the common data and address bus 217 of the processing unit 203.

The processing unit 203 may include the code Read Only Memory (ROM) 312 coupled to the common data and address bus 217 for storing data for initializing system components. The processing unit 203 may further include the controller 220 coupled, by the common data and address bus 217, to the Random-Access Memory 204 and the static memory 222.

The communication unit 202 may include one or more wired and/or wireless input/output (I/O) interfaces 209 that are configurable to communicate with the communication devices 120 and the database 103 (and/or peripheral devices). For example, the communication unit 202 may include one or more transceivers 208 and/or wireless transceivers for communicating with the communication devices 120 and the database 103 and/or peripheral devices). Hence, the one or more transceivers 208 may be adapted for communication with one or more communication networks used to communicate with the communication devices 120 and the database 103 and/or peripheral devices). For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) networks, a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a Bluetooth transceiver, a Wi-Fi transceiver, a WiMAX transceiver, and/or another similar type of wireless transceiver configurable to communicate via a wireless radio network.

The communication unit 202 may optionally include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The controller 220 may include ports (e.g. hardware ports) for coupling to other hardware components and/or peripheral devices.

The controller 220 includes one or more logic circuits, one or more processors, one or more microprocessors, one or more ASIC (application-specific integrated circuits) and one or more FPGA (field-programmable gate arrays), and/or another electronic device. In some examples, the controller 220 and/or the server 101 is not a generic controller and/or a generic device, but a device specifically configured to implement functionality for generating customized application data for first responders. For example, in some examples, the server 101 and/or the controller 220 specifically comprises a computer executable engine configured to implement functionality for generating customized application data for first responders.

The static memory 222 is a non-transitory machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 2, programming instructions (e.g., machine readable instructions) that implement the functional teachings of the server 101 as described herein are maintained, persistently, at the memory 222 and used by the controller 220 which makes appropriate utilization of volatile storage during the execution of such programming instructions.

Figure 4:
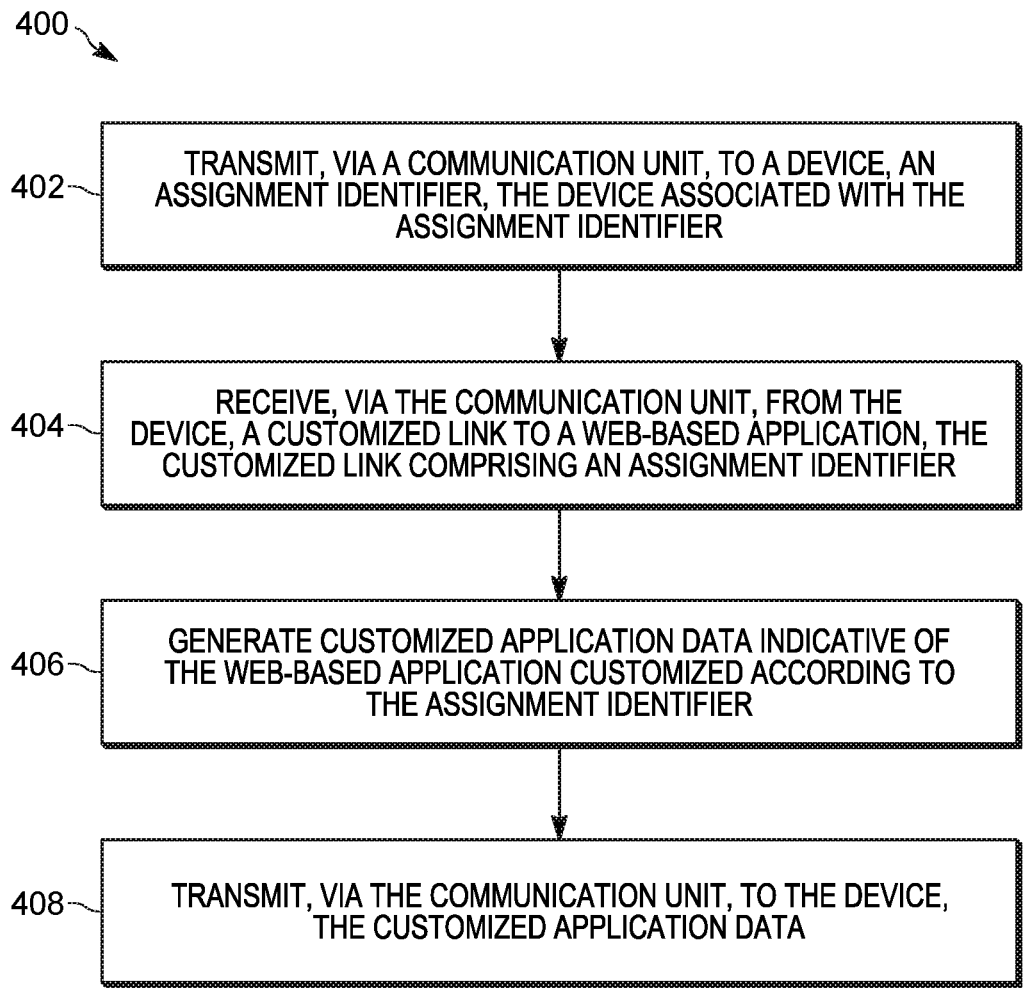
FIG. 4 is a flowchart of a method for generating customized application data for first responders, in accordance with some examples.

In particular, the memory 222 stores instructions corresponding to the at least one application 223 that, when executed by the controller 220, enables the controller 220 to implement functionality for generating customized application data for first responders including, but not limited to, the blocks of the method set forth in FIG. 4. In illustrated examples, when the controller 220 executes the one or more applications 223, the controller 220 is enabled to: receive, via the communication unit 202, from a device (such as a communication device 120), a customized link to the web-based application 105, the customized link comprising an assignment identifier 107; generate customized application data indicative of the web-based application 105 customized according to the assignment identifier 107; and transmit, via the communication unit 202, to the device, the customized application data.

The application 223 may include programmatic algorithms, and the like, to generate customized application data indicative of the web-based application 105 customized according to an assignment identifier 107, and the like.

Alternatively, the application 223 may include machine learning and/or deep-learning based algorithms and/or neural networks, and the like, which have been trained to generate customized application data indicative of the web-based application 105 customized according to an assignment identifier 107, and the like. Furthermore, in these examples, the application 223 may initially be operated by the controller 220 in a training mode to train the machine learning and/or deep-learning based algorithms and/or neural networks of the application 223 to generate customized application data indicative of the web-based application 105 customized according to an assignment identifier 107, and the like; for example, the customization data 109 may include machine learning classifiers, and the like, for customizing the web-based application 105 for a particular first responder 121 and/or a particular first responder type and/or role.

The one or more machine learning algorithms and/or deep learning algorithms and/or neural networks of the application 223 may include, but are not limited to: a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public-safety and/or security environments. However, any suitable machine learning algorithm and/or deep learning algorithm and/or neural network is within the scope of present examples.

Figure 3:
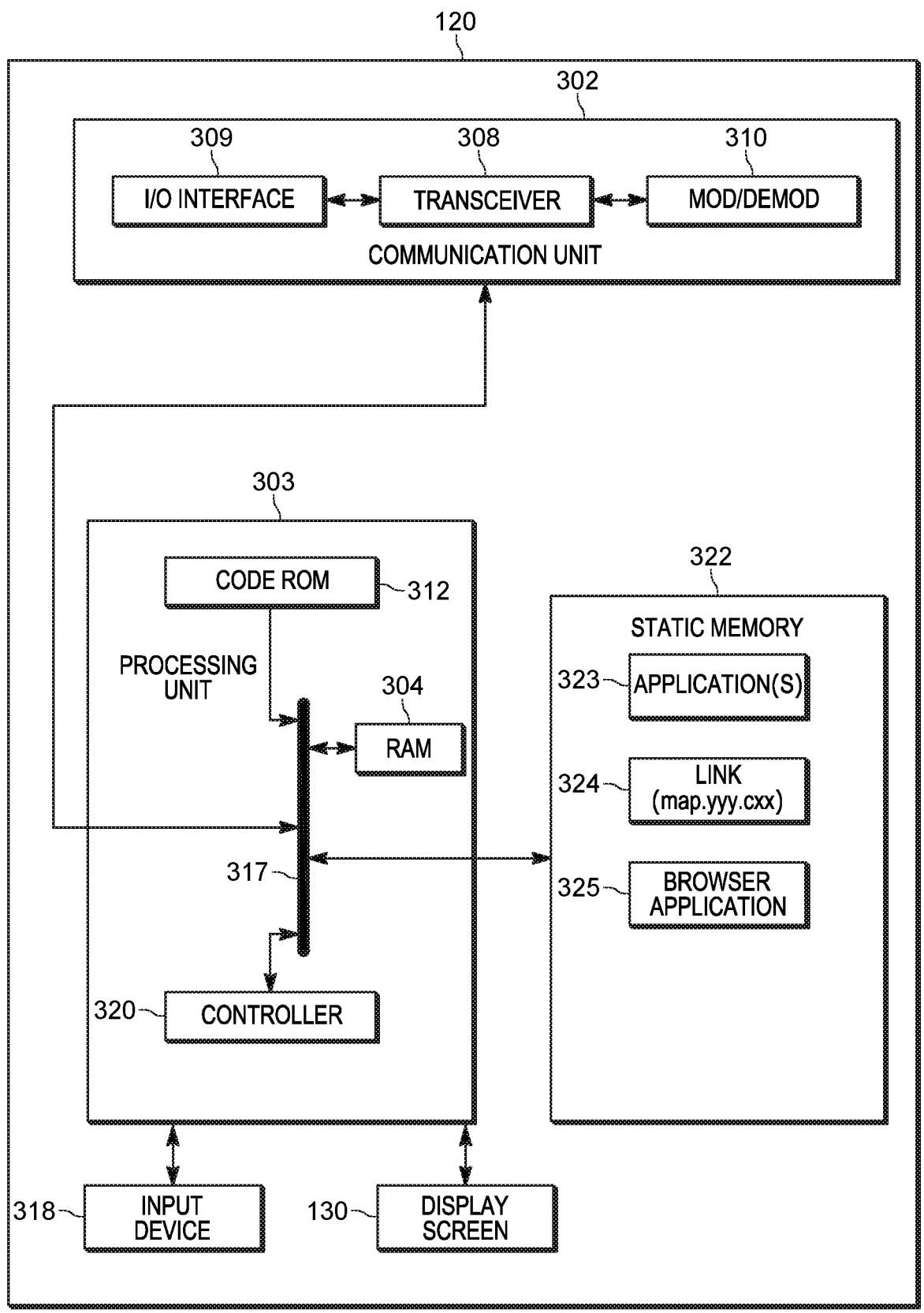
FIG. 3 is a diagram showing a structure of a device for rendering customized application data for first responders, in accordance with some examples

Attention is next directed to FIG. 3 which depicts a schematic block diagram of an example of a communication device 120. In general, a communication device 120 may comprise one or more of a mobile device, a radio, a cell phone, and the like including, but not limited to hand-held devices (e.g. as depicted in FIG. 1) and/or vehicle communication devices (e.g. radios of a patrol car, a fire truck, an ambulance, and the like). However, the communication device 120 may comprise a computing device such as a personal computer and/or a laptop computer, and the like.

As depicted, the communication device 120 comprises: a display device 130, a communication unit 302, a processing unit 303, a Random-Access Memory (RAM) 304, one or more wireless transceivers 308, one or more wired and/or wireless input/output (I/O) interfaces 309, a combined modulator/demodulator 310, a code Read Only Memory (ROM) 312, a common data and address bus 317, an input device 318, a controller 320, and a static memory 322 storing at least one application 323 and a link 324 to the web-based application 105, and a browser application 325. Hereafter, the at least one application 323 will be interchangeably referred to as the application 323.

The link 324 to the web-based application 105 comprises a network address and/or an IP address, and the like for accessing the web-based application 105. In particular, the link 324 may comprise a URL and the like for the web-based application 105. For example, as depicted, the link 324 comprises "map.yyy.cxx".

The input device 318 may include one or more of a touch screen of the display screen 130, a keyboard, a pointing device, and the like.

As shown in FIG. 3, the communication device 120 includes the communication unit 302 communicatively coupled to the common data and address bus 317 of the processing unit 303.

The processing unit 303 may include the code Read Only Memory (ROM) 312 coupled to the common data and address bus 317 for storing data for initializing system components. The processing unit 303 may further include the controller 320 coupled, by the common data and address bus 317, to the Random-Access Memory 304 and the static memory 322.

The communication unit 302 may include one or more wired and/or wireless input/output (I/O) interfaces 309 that are configurable to communicate with the server 101. For example, the communication unit 302 may include one or more transceivers 308 and/or wireless transceivers for communicating with the server 101. Hence, the one or more transceivers 308 may be adapted for communication with one or more communication networks used to communicate with the server 101. For example, the one or more transceivers 308 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) networks, a Worldwide Interoperability for Microwave Access (WiMAX) network, for example operating in accordance with an IEEE 802.16 standard, and/or another similar type of wireless network. Hence, the one or more transceivers 308 may include, but are not limited to, a cell phone transceiver, a DMR transceiver, P25 transceiver, a TETRA transceiver, a Bluetooth transceiver, a Wi-Fi transceiver, a WiMAX transceiver, and/or another similar type of wireless transceiver configurable to communicate via a wireless radio network.

The communication unit 302 may optionally include one or more wireline transceivers 308, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 308 is also coupled to a combined modulator/demodulator 310.

The controller 320 may include ports (e.g. hardware ports) for coupling to other hardware components.

The controller 320 includes one or more logic circuits, one or more processors, one or more microprocessors, one or more ASIC (application-specific integrated circuits) and one or more FPGA (field-programmable gate arrays), and/or another electronic device. In some examples, the controller 320 and/or the communication device 120 is not a generic controller and/or a generic device, but a device specifically configured to implement functionality for rendering customized application data for first responders. For example, in some examples, the communication device 120 and/or the controller 320 specifically comprises a computer executable engine configured to implement functionality for rendering customized application data for first responders.

The static memory 322 is a non-transitory machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 3, programming instructions (e.g., machine readable instructions) that implement the functional teachings of the communication device 120 as described herein are maintained, persistently, at the memory 322 and used by the controller 320 which makes appropriate utilization of volatile storage during the execution of such programming instructions.

Figure 5:
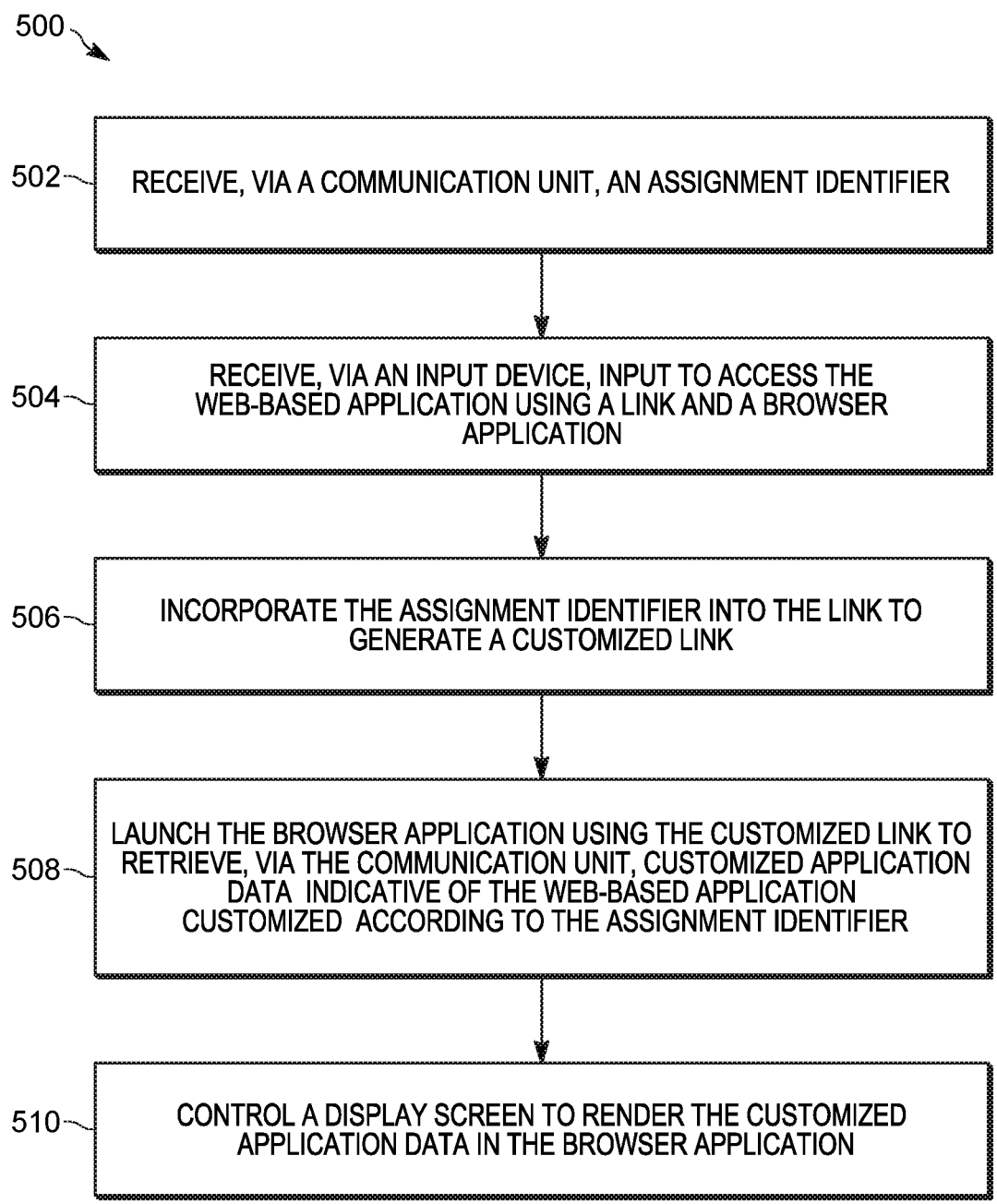
FIG. 5 is a flowchart of a method for rendering customized application data for first responders, in accordance with some examples.

In particular, the memory 322 stores instructions corresponding to the at least one application 323 that, when executed by the controller 320, enables the controller 320 to implement functionality for rendering customized application data for first responders including, but not limited to, the blocks of the method set forth in FIG. 5. In illustrated examples, when the controller 320 executes the one or more applications 323, the controller 320 is enabled to: receive, via the communication unit 302, an assignment identifier 107; receive, via the input device 318, input to access the web-based application 105 using the link 324 and the browser application 325; incorporate the assignment identifier 107 into the link 324 to generate a customized link; launch the browser application 325 using the customized link to retrieve, via the communication unit 302, customized application data indicative of the web-based application 105 customized according to the assignment identifier 107; and control the display screen 130 to render the customized application data in the browser application 325.

The application 323 may include programmatic algorithms, and the like, to generate a customized link from the link 324 and an assignment identifier 107. For example, the application 323 may append an assignment identifier 107 to the link 324, for example using one or more separator characters such as a backwards slash, brackets, and the like.

Attention is now directed to FIG. 4 which depicts a flowchart representative of a method 400 for generating customized application data for first responders. The operations of the method 400 of FIG. 4 correspond to machine readable instructions that are executed by the server 101, and specifically the controller 220 of the server 101. In the illustrated example, the instructions represented by the blocks of FIG. 4 are stored at the memory 222 for example, as the application 223. The method 400 of FIG. 4 is one way in which the controller 220 and/or the server 101 and/or the system 100 may be configured. Furthermore, the following discussion of the method 400 of FIG. 4 will lead to a further understanding of the system 100, and its various components.

The method 400 of FIG. 4 need not be performed in the exact sequence as shown and likewise various blocks may be performed in parallel rather than in sequence. Accordingly, the elements of method 400 are referred to herein as "blocks" rather than "steps." The method 400 of FIG. 4 may be implemented on variations of the system 100 of FIG. 1, as well.

At an optional block 402, the controller 220 and/or the server 101 transmits, via the communication unit 202, to a device (e.g. a communication device 120), an assignment identifier 107, the device associated with the assignment identifier 107. For example, the assignment identifier 107 may have been assigned to a first responder 121, operating a communication device 120, by a CAD server and/or the server 101 in association with assigning the first responder 121 to an incident. Hence, in some examples, a server other than the server 101 (e.g. a CAD server), may transmit the assignment identifier 107 to a communication device 120 assigned to an incident. However, in the depicted example the server 101 may transmit the assignment identifier 107 to a communication device 120 assigned to an incident. In some of these examples, the server 101 may further generate an assignment identifier 107 and/or assign a first responder 121 to an incident. Regardless, the assignment identifier 107 is generally stored at the database 103 in association with respective customization data 109. Hence, the server 101 may further generate the customization data 109 and/or have access to customization data 109 for a particular incident type, a role of a first responder, and the like; similarly the server 101 generally has access to a type and/or role of a first responder 121 associated with a communication device 120 to which an assignment identifier 107 is transmitted, with the customization data 109 selected and/or generated accordingly.

At a block 404, the controller 220 and/or the server 101 receives, via the communication unit 202, from a device (such as the communication device 120 to which an assignment identifier 107 was transmitted at the block 402), a customized link to the web-based application 105, the customized link comprising the assignment identifier 107 (e.g. as transmitted at the block 402). For example, as described below with respect to FIG. 5, a communication device 120 that received the assignment identifier 107, transmitted by the server 101 at the block 402, may generate and transmit a customized link to the web-based application 105 that includes the received assignment identifier 107.

At a block 406, the controller 220 and/or the server 101 generates customized application data indicative of the web-based application 105 customized according to the assignment identifier 107.

For example, the controller 220 and/or the server 101 may generate the customized application data using customization data 109 associated with the assignment identifier 107, as received with the customized link at the block 404. In some examples, the controller 220 and/or the server 101 may generate the customized application data by customizing a visual layout of the web-based application 105, the visual layout associated with the assignment identifier 107 as described above. Similarly, in some examples, the controller 220 and/or the server 101 may generate the customized application data by customizing a configuration of the web-based application 105, the configuration associated with the assignment identifier 107 as described above.

Put another way, the controller 220 and/or the server 101 may generate the customized application data by: accessing a memory (e.g. a memory storing the assignment identifiers 107 and the customization data 109) to determine one or more of: a visual layout of the web-based application 105 associated with the assignment identifier 107; and a configuration of the web-based application 105 associated with the assignment identifier 107.

In particular, the customized application data may comprise a view of the web-based application 105 for rendering at a display screen 130 at the browser application 325. Examples are described below with respect to FIG. 6, FIG. 7 and FIG. 8.

In yet further examples, as described below, the customized link may include a peripheral device identifier, and the customized application data may be further customized according to the peripheral device identifier. For example, the customized application data may be customized for rendering at a particular type of display screen (e.g. a display screen at an RSM) and/or include information that may be configured according to a peripheral device that provides enhanced functionality at a communication device 120 (e.g. such as car camera that provides a real-time field-of-view video stream to a communication device 120). For example, the customized application data may include data that may be combined with a real-time field-of-view video stream for rendering an augmented reality environment (e.g. symbols representing obstacles, suspicious persons, and map coordinates thereof). Hence, in these examples, customization data 109 may be customized for rendering in an augmented reality environment. In yet further examples, the customized application data may hence include additional information and/or features according to a peripheral device type (e.g. additional over when a peripheral device identifier is not included in the customized link).

At a block 408, the controller 220 and/or the server 101 transmits, via the communication unit 202, to the device (e.g. a communication device 120 from which the assignment identifier 107 was received at the block 404), the customized application data. Operations of a communication device 120 requesting the customized application data are next described.

Attention is now directed to FIG. 5 which depicts a flowchart representative of a method 500 for generating customized application data for first responders. The operations of the method 500 of FIG. 5 correspond to machine readable instructions that are executed by the communication device 120, and specifically the controller 320 of the communication device 120. In the illustrated example, the instructions represented by the blocks of FIG. 5 are stored at the memory 322 for example, as the application 323. The method 500 of FIG. 5 is one way in which the controller 320 and/or the communication device 120 and/or the system 100 may be configured. Furthermore, the following discussion of the method 500 of FIG. 5 will lead to a further understanding of the system 100, and its various components.

The method 500 of FIG. 5 need not be performed in the exact sequence as shown and likewise various blocks may be performed in parallel rather than in sequence. Accordingly, the elements of method 500 are referred to herein as "blocks" rather than "steps." The method 500 of FIG. 5 may be implemented on variations of the system 100 of FIG. 1, as well.

At a block 502, the controller 320 and/or the communication device 120 receives, via the communication unit 302, an assignment identifier 107 for example from the server 101 (e.g. at the block 402 of the method 400) and/or another server (e.g. a CAD server). In particular, the controller 320 and/or the communication device 120 may receive the assignment identifier 107 from a public-safety server, or any other suitable server.

At a block 504, the controller 320 and/or the communication device 120 receives, via the input device 318, input to access the web-based application 105 using the link 324 and the browser application 325. For example, the display screen 130 of the communication device 120 may render, at the display screen 130, an icon and/or an actuatable option mapped to, and/or associated with, the link 324; hence, the controller 320 and/or the communication device 120 may receive, via the input device 318, the input to access the web-based application 105 when the icon is selected and/or actuated at a touch screen of the display screen 130. However, input to access the web-based application 105 using the link 324 may be received via a menu system and/or within the browser application 325 (e.g. via a bookmark, and the like, of browser application 325).

At a block 506, the controller 320 and/or the communication device 120 incorporates the assignment identifier 107 into the link 324 to generate a customized link. In some examples, the controller 320 and/or the communication device 120 may incorporate the assignment identifier 107 into the link 324, to generate the customized link, by: appending the assignment identifier 107 to the link 324. For example, the assignment identifier 107 may be appended to the link 324 using any suitable format and/or one or more separator characters such as a backwards slash, brackets, and the like. However the controller 320 and/or the communication device 120 may incorporate the assignment identifier 107 into the link 324 in any suitable format "recognizable" by the server 101 (e.g. a format that the server 101 is configured to process to generate the customized application data at the block 406 of the method 400).

In some examples, the customized link may further comprise a peripheral device identifier of a peripheral device with which a communication device 120 is in communication. For example, when a communication device 120 is in communication with an RSM, such a peripheral device identifier may identify a type of the RSM. When a communication device 120 is in communication with more than one peripheral device, and hence stores more than one peripheral device identifier, one of the peripheral device identifiers may be selected for incorporation into the customized link. For example, a given peripheral device may comprise the input device and the peripheral device identifier incorporated into the customized link may be the peripheral device identifier of the peripheral device that comprises the input device. In other words, the communication device 120 may be configured to determine whether or not the input to access the web-based application 105 using the link 324 and the browser application 325 is received at a peripheral device and, when the input to access the web-based application 105 using the link 324 and the browser application 325 is received at a peripheral device, incorporate the associated peripheral device identifier into the customized link. Alternatively, a given peripheral device may be identified, at a communication device 120, as a primary user interface device (e.g. a display screen at an RSM) and the communication device may incorporate the associated peripheral device identifier into the customized link. In yet further examples, a given peripheral device may provide enhanced functionality to a communication device 120; for example, a car camera may be in communication with a communication device 120, and the car camera may provide a real-time field-of-view video stream to the communication device 120.

At a block 508, the controller 320 and/or the communication device 120 launches the browser application 325 using the customized link to retrieve, via the communication unit 302, customized application data indicative of the web-based application 105 customized according to the assignment identifier 107, as described above. For example, the browser application 325 may be launched when the input is received at the block 506, and the customized link may be automatically input to an address bar of the browser application 325 to transmit the customized link to the server 101 to retrieve the customized application data indicative of the web-based application 105 customized according to the assignment identifier 107.

At a block 510, the controller 320 and/or the communication device 120 controls the display screen 130 to render the customized application data in the browser application 325. As described above, the customized application data may be customized for a particular type of first responder 121 operating the communication device 120, as indicated by the assignment identifier 107 and hence the first responder 121 operating the communication device 120 may have faster access to crucial information than when using the link 324 to access the web-based application 105 without customization. For example, a police officer may have faster access to a map of a region of an incident and/or a fire fighter may have faster access to a route from a fire station to an incident and/or fire hydrant locations.

Furthermore, the customized application data may be customized according to a peripheral device identifier included in the customized link. In some examples, the customized application data may be provided at a display screen of the associated peripheral device (e.g. an RSM as described above). In other applications, the customized application data may be combined with data from a peripheral device identified by the peripheral device identifier included in the customized link to provide, for example, an augmented reality environment at the display screen 130 (and/or a display screen of a peripheral device), as described above.

Figure 6:
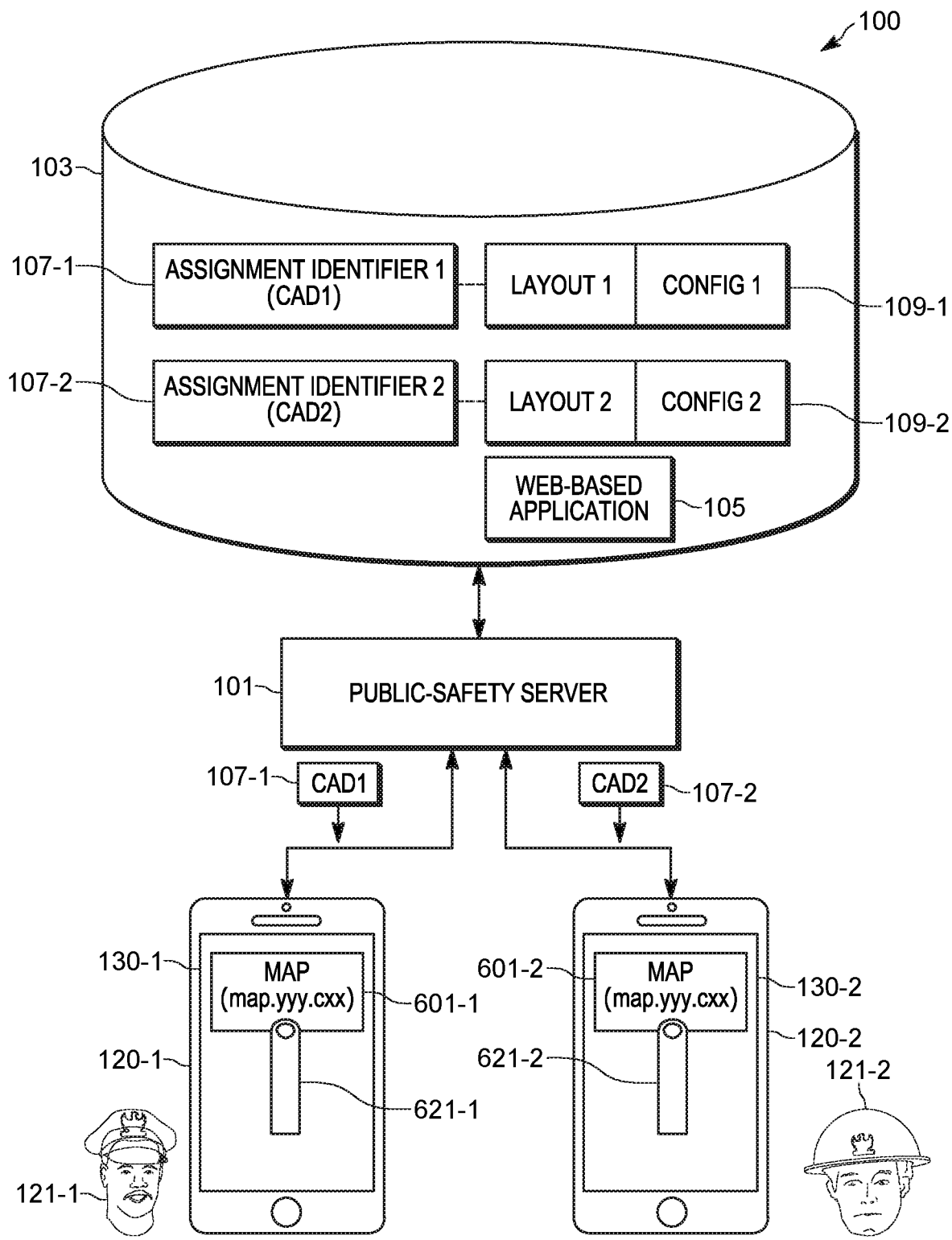
FIG. 6 depicts methods for generating and rendering customized application data for first responders in the system of FIG. 1, in accordance with some examples.
Figure 7:
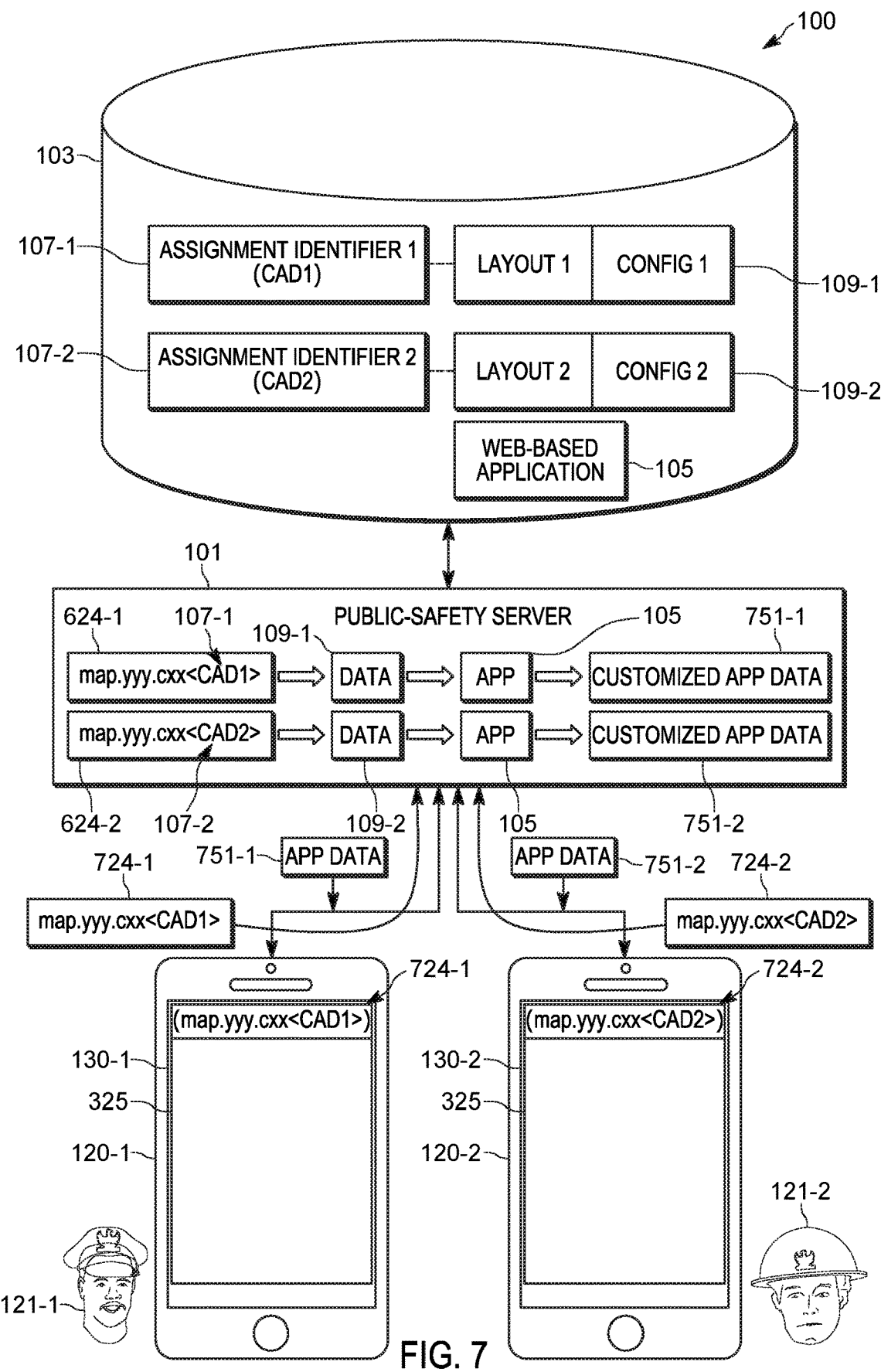
FIG. 7 further depicts the methods for generating and rendering customized application data for first responders in the system of FIG. 1, in accordance with some examples.
Figure 8:
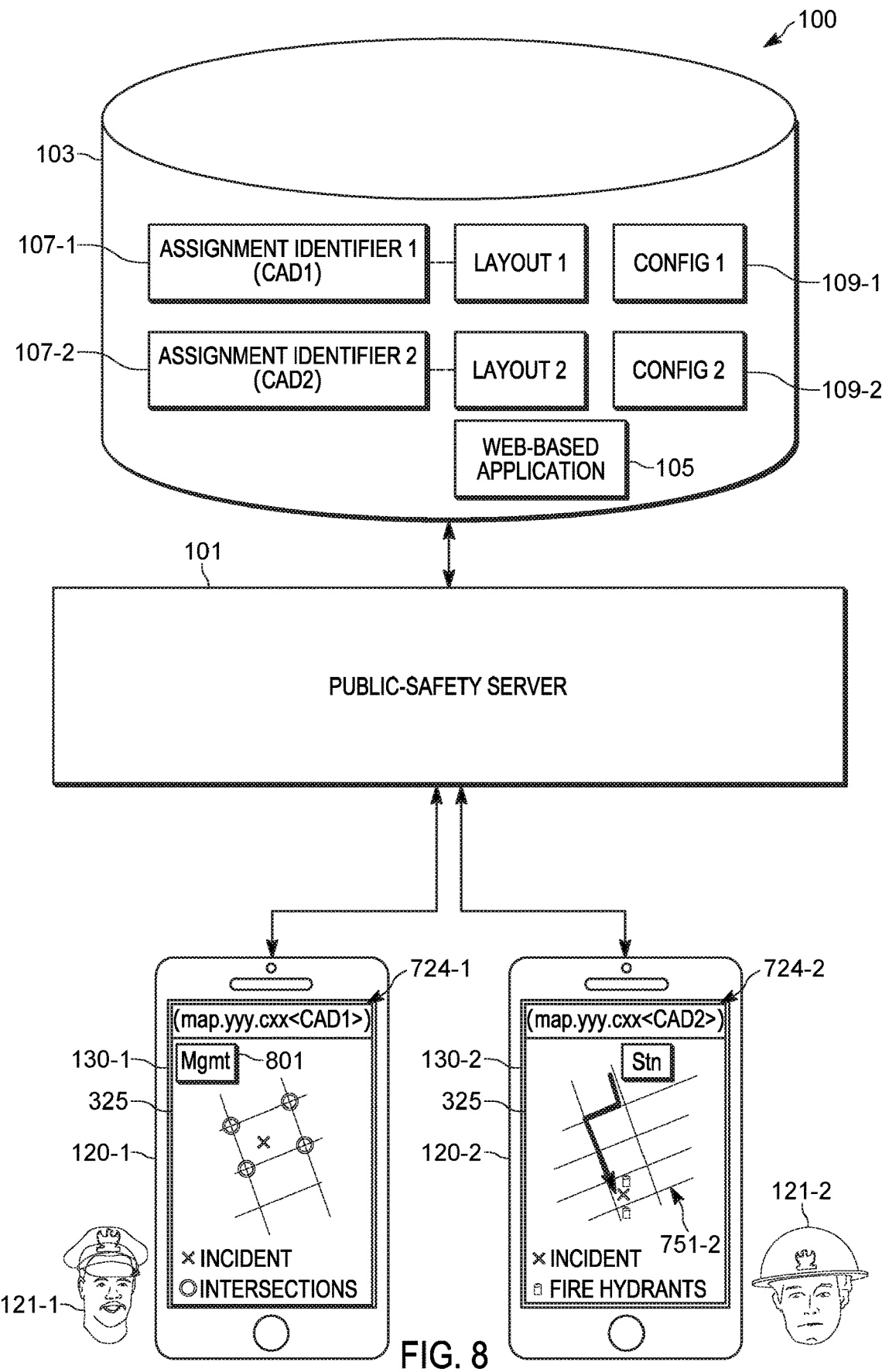
FIG. 8 further depicts the methods for generating and rendering customized application data for first responders in the system of FIG. 1, in accordance with some examples.

An example of the method 400 and the method 500 is next described with respect to FIG. 6. FIG. 7 and FIG. 8, which are substantially similar to FIG. 1 with like components having like numbers.

With reference to FIG. 6, the server 101 may transmit (e.g. at the block 402 of the method 400), to the communication devices 120-1, 120-2, respective assignment identifiers 107-1, 107-2. The assignment identifiers 107-1, 107-2 are received (e.g. at the block 502 of the method 400) at the communication devices 120-1, 120-2.

As depicted, in FIG. 6, each of the communication devices 120-1, 120-2 may further provide and/or render an icon 601-1, 601-2 at a respective display screen 130-1, 130-2 for launching a respective browser application 325 and retrieving application data indicative of the web-based application 105 using the link 324 (e.g. the icons 601-, 601-2 may be mapped to, and/or associated with, the link 324).

As also depicted in FIG. 6, a respective first responder 121-1, 121-2 is using a respective finger 621-1, 621-2 to activate a respective icon 601-1, 601-2 at a respective display screen 130-1, 130-2 (e.g. it is understood that, in the depicted example, the display screens 130 comprise a respective touch screen). Activation of an icon 601-1, 601-2 corresponds to receipt (e.g. at the block 504 of the method 500) of input to access the web-based application 105. It is understood that such an activation may occur after the assignment identifiers 107-1, 107-2 are received. Furthermore, in some examples, an icon 601-1, 601-2 may change appearances after a respective assignment identifier 107-1, 107-2 is received to indicate that the associated web-based application 105 may be accessed, using an icon 601-1, 601-2, customized according to a respective assignment identifier 107-1, 107-2.

With reference to FIG. 7, the communication devices 120-1, 120-2 may incorporate (e.g. at the block 506 of the method 500) the assignment identifier 107 into the link 324 to generate a respective customized link 724-1, 724-2. The communication devices 120-1, 120-2 launch (e.g. at the block 508 of the method 500) the browser application 325 to retrieve respective customized application data 751-1, 751-2, for example by automatically inputting a respective customized link 724-1, 724-2 into a respective address bar of the browser application 325. Furthermore, the communication devices 120-1, 120-2 transmit (e.g. also at the block 508 of the method 500) a respective customized link 724-1, 724-2 to the server 101. The transmission may occur in conjunction with launching the browser application 325.

As depicted, it is understood that a customized link 724-1, 724-2 comprises the link 324 with a respective assignment identifier 107-1, 107-2 appended thereto via separator characters (e.g. as depicted an assignment identifier 107 is enclosed by brackets "<", ">" and appended to the link 324).

Continuing with FIG. 7, the server 101 receives (e.g. at the block 404 of the method 400) the customized links 724-1, 724-2 and generates (e.g. at the block 406 of the method 400) respective customized application data 751-1, 751-2 indicative of the web-based application 105 customized according to a respective assignment identifier 107-1, 107-2. For example, as depicted, the assignment identifier 107-1 of the customized link 724-1 is used to retrieve the associated customization data 109-1 from the database 103, and the customization data 109-1 is used to customize the web-based application 105 to generate customized application data 751-1. Similarly, as depicted, the assignment identifier 107-2 of the customized link 724-2 is used to retrieve the associated customization data 109-2 from the database 103, and the customization data 109-2 is used to customize the web-based application 105 to generate customized application data 751-2.

As depicted, the server 101 transmits (e.g. at the block 408 of the method 400) the customized application data 751-1, 751-2 to respective communication devices 120-1, 120-2, which receive (e.g. also at the block 508 of the method 500) the customized application data 751-1, 751-2.

With reference to FIG. 8, the communication devices 120-1, 120-2 render (e.g. at the block 510 of the method 500) the respective customized application data 751-1, 751-2 in the browser application 325 at a respective display screen 130-1, 130-2.

As depicted, the customized application data 751-1, rendered at the display screen 130-1, is indicative of the web-based application 105 customized for police officers and depicts a map showing a location of an associated incident (e.g. indicated by an "x" on the map) and suggested intersections (e.g. indicated by concentric circles on the map) that should be blocked off to control access to the incident. As depicted, the customized application data 751-1 further includes an actuatable option 801 (e.g. in the form of a touch screen button within the map) for launching an incident management application for police officers. When the actuatable option 801 is actuated, and the like, the blocks 504, 506, 508, 510 of the method 500 may be repeated such that the incident management application is opened in another tab of the browser application 325, customized according to the assignment identifier 107-1; in other words, in these examples, it is understood that the database 103 may store additional customization data for customizing an incident management application.

Similarly, as depicted, the customized application data 751-2, rendered at the display screen 130-2, is indicative of the web-based application 105 customized for fire fighters and depicts a respective map showing a fastest route from a fire station (e.g. "Stn" on the respective map) to the location of the associated incident (e.g. indicated by an "x" on the respective map), for example using an arrow that follows streets on the map. The respective map of the customized application data 751-2 generally shows a larger area around the incident location the map of the customized application data 751-1, such that the fire station location is included on the respective map. The customized application data 751-2 further indicates positions of fire hydrants that fire fighters may use in association with the incident (e.g. which may be a fire).

However, the example of FIG. 8 is particular to the web-based application 105 being a mapping application, however the customization of the web-based application 105 may occur in any suitable manner as described above. For example, when the web-based application 105 comprise the incident management application, the incident management application may be customized for police officers or fire fighters, accordingly.

Alternatively, customized application data 751-1, 751-2, may be rendered at a peripheral device as described above and/or the customized application data 751-1, 751-2 may be customized according to a peripheral device and/or include information that may be combined with information from a peripheral device.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method comprising:
   receiving, at a device, an assignment identifier;
   receiving, via an input device, input to access a web-based application using a link and a browser application stored at a memory;
   incorporating, at the device, the assignment identifier into the link to generate a customized link;
   launching, at the device, the browser application using the customized link to retrieve customized application data indicative of the web-based application customized according to the assignment identifier; and
   controlling a display screen to render the customized application data in the browser application,
   wherein the customized application data is customized for a particular type of first responder as indicated by the assignment identifier such that the first responder has faster access to given information incorporated into the customized application data, than when using the link to access the web-based application without customization,
   wherein the assignment identifier comprises one of: a first incident identifier assigned to a first type of responder; or a second incident identifier assigned to a second type of responder, and
   wherein the assignment identifier identifies the particular type of the first responder as being of the first type or the second type, such that the customized application data is customized for the first type or the second type.

2. The method of claim 1, wherein incorporating the assignment identifier into the link, to generate the customized link, comprises:
   appending the assignment identifier to the link.

3. The method of claim 1, wherein the assignment identifier further comprises one or more of:
   a computer-aided dispatch (CAD) identifier; and
   a role identifier.

4. The method of claim 1, wherein the link comprises a Uniform Resource Locator (URL) for the web-based application.

5. The method of claim 1, wherein receiving the assignment identifier comprises: receiving the assignment identifier from a public-safety server.

6. The method of claim 1, wherein:
   the device comprises a mobile device for first responders,
   the assignment identifier is received, at the mobile device, from a public safety server, and
   the customized application data is retrieved, by the mobile device, using the browser application and the customized link, from the public safety server.

7. The method of claim 1, wherein the assignment identifier further comprises a role identifier.

8. A device comprising:
   a communication unit; an input device; a display screen; a memory storing: a link to a web-based application; and a browser application; and
   a controller communicatively coupled to, the communication unit, the input device, the display screen, and the memory, the controller configured to:
      receive, via the communication unit, an assignment identifier;
      receive, via the input device, input to access the web-based application using the link and the browser application;
      incorporate the assignment identifier into the link to generate a customized link;
      launch the browser application using the customized link to retrieve, via the communication unit, customized application data indicative of the web-based application customized according to the assignment identifier; and
      control the display screen to render the customized application data in the browser application,
      wherein the customized application data is customized for a particular type of first responder as indicated by the assignment identifier such that the first responder has faster access to given information incorporated into the customized application data, than when using the link to access the web-based application without customization,
      wherein the assignment identifier comprises one of: a first incident identifier assigned to a first type of responder; or a second incident identifier assigned to a second type of responder, and
      wherein the assignment identifier identifies the particular type of the first responder as being of the first type or the second type, such that the customized application data is customized for the first type or the second type.

9. The device of claim 8, wherein the controller is further configured to incorporate the assignment identifier into the link, to generate the customized link, by:
   appending the assignment identifier to the link.

10. The device of claim 8, wherein the assignment identifier further comprises one or more of:
    a computer-aided dispatch (CAD) identifier; and
    a role identifier.

11. The device of claim 8, wherein the link comprises a Uniform Resource Locator (URL) for the web-based application.

12. The device of claim 8, wherein the controller is further configured to receive, via the communication unit, the assignment identifier from a public-safety server.

13. The device of claim 8, wherein:
    the device comprises a mobile device for first responders,
    the assignment identifier is received, at the mobile device, from a public safety server, and
    the customized application data is retrieved, by the mobile device, using the browser application and the customized link, from the public safety server.

14. The device of claim 8, wherein the assignment identifier further comprises a role identifier.

* * * * *